3,433,755
ION-EXCHANGE MATERIAL FROM HALOGENATED POLYETHYLENE

Brian Alfred Cooke, Chalfont St. Peter, England, and George Gourlay, Saltcoats, Scotland, assignors to Imperial Chemical Industries Limited, Millbank, London, England, a corporation of Great Britain
No Drawing. Filed July 26, 1965, Ser. No. 474,939
Claims priority, application Great Britain, Aug. 18, 1964, 33,719/64
U.S. Cl. 260—2.2       12 Claims
Int. Cl. C08f 27/00; B01d 15/04

ABSTRACT OF THE DISCLOSURE

A process for preparing polymeric ion-exchange material is disclosed. Halogenated polyethylene is reacted, in the presence of a Friedel-Crafts catalyst, with benzene or a substituted alkyl benzene to substitute aromatic nuclei in the polyethylene chain. The resulting polymeric material is treated in the conventional manner to attach ion-exchange groups to the aromatic nuclei of the polymeric material.

---

This invention relates to the preparation of polymeric material suitable for activation to ion-exchange material, and to polymeric ion-exchange materials prepared therefrom.

Ion-exchange resins and membranes have been described previously which have been based on polystyrene activated by substitution of ion-exchange groups in the aromatic nuclei and crosslinked by divinyl benzene. Thus ion-exchanges resins have been prepared by a process involving "bead" copolymerisation of styrene/divinyl benzene mixtures suspended in an aqueous medium, followed by activation of the beads. Activation to cation-exchange resins was effected by treatment with oleum or chlorosulphonic acid, followed by alkali treatment, and activation to anion-exchange resins was effected by chloromethylation with chloromethyl methyl ether or other suitable reagent, followed by treatment with an amine to produce quaternized aminoalkyl salt substituted groups on the styrene.

Ion-exchange membranes for electrodialysis have in the past been made, for instance, by incorporating a finely divided anion- or cation-exchange resin of the above type in a continuous thermoplastic matrix of polyethylene or other suitable polymer, and forming the resultant mixtures into sheets. However, membranes of improved capacity and performance have been described in which polyethylene in particle or sheet form is impregnated with styrene or methylstyrene/divinyl benzene mixture, and subsequently polymerised by exposure to radiation or by use of a suitable catalyst. The polyethylene is subsequently activated in sheet form as previously described for ion-exchange resins.

The above types of membrane are not truly homogeneous due, in the former case, to the impossibility of achieving perfect mixing and in the latter case to unevenness in the penetration of the styrene monomer and local differences in the crosslinking and degree of polymerisation.

An object of the present invention is to provide a process for preparing a polymer material based on polyethylene and aromatic hydrocarbon and suitable for activation to ion-exchange material of more homogeneous character than such polymeric materials hitherto available.

In accordance with the invention polymeric material suitable for activation to ion-exchange material is prepared by retaining, in the presence of a Friedel-Crafts catalyst, halogenated polyethylene, containing an average of 0.02 to 0.25 halogen atom per carbon atom, with sufficient benzene or a mono- or di-substituted alkyl benzene, wherein the alkyl substituents have not more than 3 carbon atoms, to substitute in the polyethylene chain at least 0.02 aromatic nuclei per carbon atom of the chain.

The halogenated polyethylene used in the process behaves essentially as an ethylene/vinyl halide copolymer. It is conveniently used in fine powder form but if desired it may be used in a shaped form such as filament or sheet.

The polymeric products of the invention may be regarded as ethylene-vinyl halide-styrene (or alkyl substituted styrene) copolymers although in the extreme case where the halogen atoms are fully replaced by aromatic nuclei, the material is virtually an ethylene-styrene (or substituted styrene) copolymer. In general it is unnecessary to carry the reaction to complete substitution of the halogen in order to obtain polymeric materials which are useful for activation to ion-exchange material. The products of the invention give more uniform ion-exchange materials than those described above because the aromatic portion is chemically locked into the trunk polyethylene chain instead of being randomly mixed or grafted to it.

Ethylene-styrene copolymers have been prepared hitherto in poor yield from ethylene and styrene using a pressure of 1000 atmospheres and a temperature of about 250° C., but the process was not commercially practicable. The present invention provides a process for making a copolymeric material, containing linked "ethylene" and "styrene" units, which does not involve the use of high pressures and temperatures.

The reaction is preferably carried out in a solvent medium and the quantity of solvent should preferably be sufficient to cause swelling of the halogenated polyethylene, in order to speed up the reaction and to obtain even substitution of the cholrine throughout the polyethylene.

The halogenated polyethylene may, if desired, be completely dissolved but in general it is preferred merely to suspend it in the solvent medium. Generally, the preferred solvent is the benzene or substituted benzene reactant used in excess.

Suitable Friedel-Crafts catalysts include aluminum chloride, boron trifluoride and stannic chloride. The catalyst is preferably used in liquid form. Aluminum chloride may be obtained as a liquid complex with a polar liquid such as nitrobenzene and boron trifluoride may be "complexed" with ether.

The halogenated polyethylene may, for example, be chlorinated polyethylene containing 5–40%, and preferably 15–30%, by weight of chlorine or brominated polyethylene containing 8–60% by weight of bromine.

The polymeric product of the invention may be activated to ion-exchange material by treatment with ion-exchange group donor reagents using standard procedures and reaction conditions for attaching ion-exchange groups to aromatic nuclei. The ion-exchange group donor reagents are appropriately chosen to attach either cation- or anion-exchange groups, as desired, to confer on the polymeric product cation- or anion-exchange properties. For example, sulphonic groups, which confer cation-exchange properties, may be attached by treatment with hot concentrated sulphuric acid in presence of a silver salt catalyst, with chlorosulphonic acid or mixtures thereof with sulphuryl chloride followed by alkaline hydrolysis, or with the dioxane complex of sulphur trioxide dissolved in a chlorinated hydrocarbon. Amino or quaternary ammonium salt groups, which confer anion-exchange properties, may be attached by treatment with a halogeno-alkylating agent, preferably a cholrmethylating agent, in presence of a Friedel-Crafts catalyst, followed by treatment with a tertiary amine. The halogeno-alkylating agent is conveniently bis-chloromethyl ether, chloromethyl methyl ester, bis-chloroethyl ether or chloromethyl ethyl ether and the tertiary amine may conveniently be trimethylamine or N:N-dimethylethanolamine, the latter being preferred as it emits less objectionable fume.

The polymeric material should preferably be shaped to its final form before the ion-exchange groups are introduced as the activation treatment impairs the thermoplasticity of the material.

The invention is further illustrated by the following examples in which all parts and percentages are by weight.

Example 1

Chlorinated polyethylene, of chlorine content 19.8%, was pressed into a sheet 0.012 inch thick at 135° C. and 6,000 p.s.i. 2 parts of the sheet were placed into a mixture of 90 parts xylene, 8 parts nitrobenzene and 2 parts aluminum chloride for 60 hours at room temperature, removed, soaked in methanol until the colour was removed, and dried in vacuo to constant weight. Analysis showed the final chlorine content to be 4%.

The arylated sheet was placed in a mixture of 95 parts chloromethyl methyl ether and 5 parts anhydrous zinc chloride for 90 minutes at 55° C. The chloromethylated sheet was thoroughly washed with water and then treated with a solution of 25 parts N:N-dimethylethanolamine and 2.5 parts of ethylene diamine in 72.5 parts water at 90–95° C. for 2½ hours.

The resulting anion-exchange membrane was removed, washed thoroughly and allowed to equilibrate in N/10 NaCl.

The electrical resistance, capacity and water content of the freshly prepared anion-exchange membrane were determined and the results obtained were:

Electrical resistance of 1 cm.$^2$ _____ohms__ 6.4
Ion-exchange capacity _____milliequivalents/g__ 1.45
Water content _____percent (dry basis)__ 34

In the tests the chlorine content of the sample was determined by oxygen combustion and potentiometric titration with standard silver nitrate.

The electrical resistance is given as the resistance in ohms of a square centimetre of membrane equilibrated with 0.1 N sodium chloride at 25° C.

The capacity of the anion-exchange membrane is determined by complete conversion of ion-exchange groups within the membrane to chloride, replacing the chloride groups with sulphate ions, and estimation of the liberated chloride by titration with standard silver nitrate using chromate indicator, the capacity being calculated as milliequivalents of ion-exchange group per gram of dry membrane in the sulphate form.

The water content is determined by drying in vacuo a sample of membrane in the chloride form which has been equilibrated with distilled water.

In a test in which the resistance of the membrane to organic fouling was determined, the membrane was fouled by electrodeposition thereon of polystyrenesulphonate ions. The voltage required to pass a current of 6 milliampere/cm.$^2$ through the membrane in an electrodialysis cell was 0.04 for the fresh membrane and 0.17 for the fouled membrane.

For comparison the voltages required for an anion-exchange membrane of the same ion-exchange capacity, prepared by absorbing styrene in polyethylene, polymerising the styrene in situ and converting the material to an anion-exchange membrane, were 0.1 volt for the fresh membrane and 2.44 volts for the fouled membrane. The membrane prepared in the example is, therefore, much more resistant to organic fouling.

Example 2

Chlorinated polyethylene of chlorine content 16.7% was pressed into a sheet 0.006 inch thick.

2 parts of the sheet were placed in a mixture of 90 parts xylene, 8 parts nitrobenzene and 2 parts aluminium chloride for 60 hours at room temperature, removed, soaked in methanol until the colour was removed, and then dried in vacuo to constant weight. Analysis showed the final chlorine content to be 3.4%.

The arylated sheet was chloromethylated and aminated as described in Example 1.

The resulting anion-exchange membrane was tested for electrical resistance, capacity, water content and organic fouling resistance, as described in Example 1. The results obtained were:

Electrical resistance of 1 cm.$^2$ _____ohms__ 5.7
Capacity _____milliequivalents/g__ 1.39
Water content _____percent (dry basis)__ 31
Resistance to organic fouling _____ ($^1$)

$^1$ Voltage required to pass a current of 6 milliamperes/cm.$^2$.
    Fresh membrane _____ 0.060
    Fouled membrane _____ 0.78

Example 3

Chlorinated polyethylene of chlorine content 22.9% was pressed into a sheet at 135° C. and 6,000 p.s.i.

2 parts of sheet were immersed in a mixture of 90 parts xylene, 8 parts nitrobenzene and 2 parts aluminium chloride over a period of 24 hours at room temperature, removed, soaked in methanol and dried in vacuo to constant weight. Analysis showed the final chlorine content to be 4.3%. The arylated sheet was chloromethylated and aminated as described in Example 1.

The resulting anion-exchange membrane was tested for electrical resistance, capacity and water content as described in Example 1. The results obtained were:

Electrical resistance of 1 cm.$^2$ _____ohms__ 6.1
Capacity _____milliequivalents/g__ 1.47
Water content _____percent (dry basis)__ 36

Example 4

Chlorinated polyethylene of chlorine content 27.9% was pressed into a sheet 0.008 inch thick at 130° C. and 6,000 p.s.i.

2 parts of sheet were placed into a mixture of 90 parts benzene, 9 parts nitrobenzene and 1 part anhydrous aluminium chloride for 48 hours at room temperature, removed, soaked in methanol and dried in vacuo. Analysis showed the final chlorine content to be 6.8%.

Subsequent chloromethylation and amination of the phenylated sheet, as described in Example 1, produced an anion-exchange membrane with the following properties:

Electrical resistance of 1 cm.$^2$ _____ohms__ 8.7
Capacity _____milliequivalents/g__ 1.18
Water content _____percent (dry basis)__ 37

Example 5

2 parts of chlorinated polyethylene of chlorine content 27.9% in the form of a powder were placed in a mixture of 95 parts toluene, 4 parts nitrobenzene and 1 part anhydrous aluminium chloride for 20 hours at 65–70° C.

At the end of this period the chlorinated polyethylene had dissolved in the arylating medium. The resulting solution was poured into vigorously stirred methanol.

The precipitate, which was in the form of a very fine powder, was extracted for 6 hours with methanol and then dried to constant weight in vacuo. The chlorine content was found to be 1.27%.

The arylated powder was placed in a mixture of 95 parts chloromethyl methyl ether and 5 parts anhydrous zinc chloride for 90 minutes at 55° C.

The chloromethylated powder was filtered off, thoroughly washed with water, and then treated with a solution of 25 parts N:N-dimethylethanolamine and 2.5 parts of ethylene diamine in 72.5 parts water at 90–95° C. for 2½ hours.

The resulting anion-exchange powder was removed, washed thoroughly and allowed to equilibrate in N/10 NaCl.

The ion-exchange capacity was 1.5 milliequivalents/g.

Example 6

Chlorinated polyethylene of chlorine content 16.9% was pressed into a sheet 0.007 inch thick at 110° C. and 3,000 p.s.i.

1 part of the sheet was immersed in a mixture of 99 parts benzene and 1 part anhydrous aluminium chloride for a period of 24 hours, removed, washed with benzene, placed in methanol for 3 hours and then dried in vacuo to constant weight. Analysis showed the final chlorine content to be 3.9%.

The phenylated sheet was placed in a mixture of 95 parts chloromethyl methyl ether and 5 parts anhydrous zinc chloride for 90 minutes at 55° C. The chloromethylated sheet was thoroughly washed with water and then treated with a solution of 25 parts N:N-dimethylethanolamine in 75 parts water at 90–95° C. for 2 hours, removed, washed thoroughly and equilibrated with 0.1 N sodium chloride solution.

The resulting anion-exchange membrane was tested for electrical resistance, capacity and water content as described in Example 1. The results obtained were:

Electrical resistance of 1 cm.$^2$ _____ohms__ 6.4
Capacity _____milliequivalents/g__ 1.35
Water content _____percent (dry basis)__ 27.0

Example 7

5 parts of granular chlorinated polyethylene of chlorine content 27.5% were placed in 150 parts of xylene and allowed to swell. 1.5 parts of anhydrous aluminium chloride were then added to the vigorously stirred mixture and the reaction was allowed to proceed under a pressure of 10–15 mm. at room temperature for 1 hour. The resulting mixture was filtered into vigorously stirred methanol, the precipitate removed, dried and pressed at 125° C. and 3,000 p.s.i. into a sheet 0.0006 inch thick.

Analysis showed the chlorine content to be 4.9% at this stage.

The arylated sheet was placed in a mixture of 25 parts chloromethyl methyl ether, 70 parts n-hexane and 5 parts stannic chloride for 2 hours at reflux. It was then removed, washed with methanol and water, placed in a mixture of 25 parts dimethylethanolamine, 2½ parts ethylene diamine and 72½ parts water for 2½ hours at 90–95° C., removed, washed with water and equilibrated with 0.1 N sodium chloride.

The resulting anion-exchange membrane was tested for electrical resistance, capacity and water content as described in Example 1. The results obtained were:

Electrical resistance of 1 cm.$^2$ _____ohms__ 8.9
Capacity _____milliequivalents/g__ 1.12
Water content _____percent (dry basis)__ 34

Example 8

5 parts of chlorinated polyethylene of chlorine content 27.5% were dissolved in 100 parts of hot xylene, the resulting solution being cooled to room temperature.

A complex of 1 part anhydrous aluminium chloride in 5 parts nitrobenzene was added to the xylene solution and allowed to stand for 60 hours.

The solution was filtered into stirred methanol. The precipitate was removed, extracted with methanol for 3 hours, dried in vacuo to constant weight and pressed at 125° C. and 3,000 p.s.i.

Analysis showed the chlorine content to be 5.1%.

The arylated sheet was chloromethylated and aminated as described in Example 7.

The resulting anion-exchange membrane was tested for electrical resistance, capacity and water content as described in Example 1, and the results obtained were:

Electrical resistance of 1 cm.$^2$ _____ohms__ 8.7
Capacity _____milliequivalents/g__ 1.27
Water content _____percent__ 37

Example 9

Chlorinated polyethylene of chlorine content 27.5% was pressed into a sheet 0.010 inch thick.

2 parts of the sheet were placed into a mixture of 90 parts xylene, 8 parts nitrobenzene and 2 parts aluminium chloride for 60 hours at room temperature, removed, soaked in methanol until the colour was removed, and dried in vacuo to constant weight. The final chlorine content was 4.7%.

The arylated sheet was placed in a mixture of 10 parts chlorosulphonic acid, 89.25 parts sulphuryl chloride and 0.75 part paraformaldehyde at room temperature for a period of 24 hours.

The resulting cation-exchange membrane was removed, washed thoroughly and allowed to equilibrate in N/10 NaCl.

The electrical resistance and capacity of the freshly prepared cation-exchange membrane were determined as described in Example 1. The results obtained were:

Electrical resistance of 1 cm.$^2$ _____ohms__ 6
Capacity _____milliequivalents/g__ 1.4

What we claim is:

1. An ion-exchange polymeric material which is the product of reacting halogenated polyethylene having an average of 0.02 to 0.25 halogen atom per carbon atom, and sufficient benzene or mono- or di-substituted alkyl benzene, wherein the alkyl substituents have not more than three carbon atoms, to produce a polymeric material which has at least 0.02 aromatic nuclei substituted in the polyethylene chain per carbon atom of said chain, and subsequently subjecting the polymeric material to an activation process wherein ion-exchange groups are introduced into the aromatic nuclei of the polymeric material in order to convert said polymeric material into ion-exchange material.

2. The product as claimed in claim 1 wherein cation-exchange groups are attached by treatment with an ion-exchange group donor reagent selected from the group consisting of concentrated sulfuric acid, chlorosulphonic acid, sulphuryl chloride or the dioxane complex of sulphur trioxide.

3. The product as claimed in claim 1 wherein ion-exchange groups are attached by treatment of the polymeric material with a halogeno-alkylating agent in the presence of a Friedel-Crafts catalyst, and thereafter the halogeno-alkylated product is treated with a tertiary amine.

4. The product of claim 3 wherein the halogeno-alkylating agent is a chloro-alkylating agent.

5. The product as claimed in claim 4 wherein the chloro-alkylating agent is selected from the group consisting of bis-chloromethyl ether, methyl chloromethyl ether, bis-chloroethyl ether and chloromethyl ethyl ether.

6. The product as claimed in claim 3 wherein said tertiary amine is selected from the group consisting of trimethylamine and N:N-dimethylethanolamine.

7. The product as claimed in claim 1 wherein said polymeric material is shaped before the attachment of the ion-exchange groups.

8. The product as claimed in claim 1 wherein the halogenated polyethylene is in the form of a fine powder or shaped as a filament or sheet.

9. The product as claimed in claim 1 wherein the Friedel-Crafts catalyst comprises aluminium chloride, boron trifluoride or stannic chloride.

10. The product as claimed in claim 1 wherein the catalyst is in liquid form.

11. The product as claimed in claim 10 wherein the catalyst comprises a complex of aluminium chloride and nitrobenzene.

12. The product as claimed in claim 1 wherein the halogenated polyethylene comprises chlorinated polyethylene containing 5 to 40% by weight of chlorine or brominated polyethylene containing 8 to 60% by weight of bromine.

References Cited

UNITED STATES PATENTS 2,304,637  12/1942  Hardy _____ 260—80
3,118,857  1/1964   Carr _____ 260—45.5

FOREIGN PATENTS 778,639  7/1957  Great Britain.

OTHER REFERENCES

Teyssie et al., J. Polymer Science, 20, 351–369 (1956).
Helfferich, Ion Exchange, N.Y., McGraw-Hill, 1962 (pp. 38, 52–53).

WILLIAM H. SHORT, *Primary Examiner.*

M. GOLDSTEIN, *Assistant Examiner.*

U.S. Cl. X.R.

260—2.1, 94.9, 88.2